Nov. 19, 1963         J. D. FRY ETAL         3,111,174
PARALLEL LINKAGE ADJUSTING MEANS FOR A TOOL BAR
Filed Oct. 20, 1961                          3 Sheets-Sheet 1

INVENTORS.
JOSEPH DALE FRY
BY EUGENE F. WARE

Wells & St. John
ATTYS.

Nov. 19, 1963  J. D. FRY ETAL  3,111,174
PARALLEL LINKAGE ADJUSTING MEANS FOR A TOOL BAR
Filed Oct. 20, 1961  3 Sheets-Sheet 2

INVENTORS
JOSEPH DALE FRY
EUGENE F. WARE
BY
*Wells & St. John*
ATTYS.

United States Patent Office 3,111,174
Patented Nov. 19, 1963

3,111,174
PARALLEL LINKAGE ADJUSTING MEANS FOR A TOOL BAR
Joseph Dale Fry, % Hume-Fry Co., P.O. Box 382, and Eugene F. Ware, 905 Center St., both of Garden City, Kans.
Filed Oct. 20, 1961, Ser. No. 146,462
9 Claims. (Cl. 172—244)

This invention relates to a novel tool bar for carrying earth working agricultural implements.

Many hitches and tool bars have been devised to draw farm implements such as plows, harrows and cultivators. In order to efficiently utilize such equipment it is essential that the positioning of the implements be under the precise control of the one operating the equipment. Exact placement is particularly important in row crop operations. Another problem which frequently presents itself is the necessity of maintaining such tools below the ground surface in opposition to natural forces which tend to lift them from their working positions.

It is a first object of this invention to provide a tool bar which includes a forward frame fixed to a drawbar of a tractor so as to be immovable relative to the tractor frame. This construction, plus the relation of the tool supporting frame to the forward frame, insures exact placement of the tools as they follow the tractor.

Another object of this invention is to allow the operator to selectively exert pressure on the tool bar to maintain the implements below the soil surface, to lift the implements from the ground for transporting, or to allow the implements to move along the soil without external biasing in a vertical direction. This control emanates from a single power source which may be remotely operated by a tractor operator.

A most important object is to allow one to utilize the relatively stable frame of a tractor or other vehicle as a reactive member to lift or lower soil-working implements. This construction allows one to mount a tool bar at the rear of a tractor in a cantilevered condition when desired. It also allows the operator to exert a positive downward force on the earth working tools without the addition of dead weight to the tool bar.

These objects are attained by combining a parallelogram supported tool bar assembly with a novel linkage by which the stationary portions of the assembly are used as reactive members to effect the raising or lowering of the movable portions of the assembly. No exterior ground support is necessary.

The drawings and the related description which follows pertain to a single embodiment of the invention. This embodiment is illustrative and is not intended to limit or restrict the extent of coverage afforded hereby, except as the invention is defined in the claims which are annexed hereto.

Figure 1:
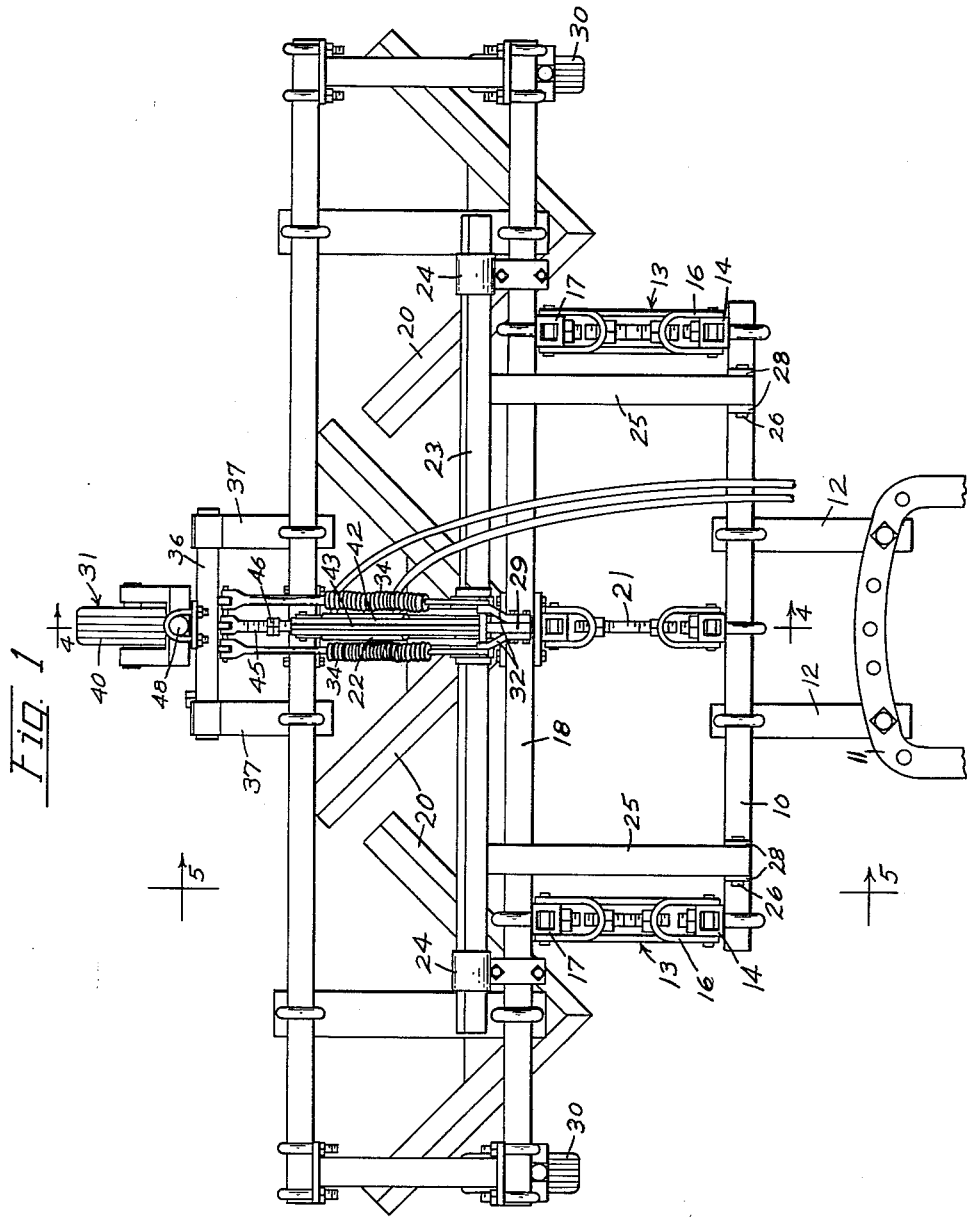
FIGURE 1 is a top view of the tool bar in a raised position.

This invention is concerned with a tool bar for carrying earth working farm implements behind a farm tractor. The tool bar includes a fixed frame and a vertically adjustable frame on which the implements are mounted.

The basic structure can be seen in FIGURES 1–3 and 5. The fixed frame includes a first member 10 which extends perpendicularly to the intended direction of travel of the implements relative to the ground. Member 10 is securely fastened to a tractor drawbar 11 by means of two rigid brackets 12. Thus the member 10 is fixed relative to the framework of the tractor on which drawbar 11 is mounted.

The movable frame is supported by a pair of spaced vertical parallelogram assemblies 13 located along the length of member 10. Each assembly includes a first vertical element 14 rigidly fixed to the member 10. Pivoted to the element 14 are two parallel links 15 and 16. The upper link 16 is longitudinally adjustable. A second vertical element 17 is pivotally connected to the links 15, 16 to complete the parallelogram configuration. The normal position of elements 17 is parallel or substantially parallel to the elements 14. However this relation can be altered by lengthening or shortening the upper links 16 of the respective assemblies.

The movable frame, as shown, comprises a rigid member 18 which is an open rectangular frame of rigid tubular construction. The implements 20 may be suspended from member 18 by any suitable mounting arrangement, dependent upon the nature of the implement, the spacing desired, etc.

Member 18 is positioned parallel to the fixed member 10 and is securely fastened to the second vertical element 17 of each parallelogram assembly. A central adjustable link 21 is pivoted at its ends to member 10 and member 18 respectively to aid in the transmission of a pulling force between these two members. It may be seen from the drawings that the elevation and angular disposition of member 18 relative to member 10 is directly related to the positions of elements 17 to which it is secured. Thus the member 10 must follow the parallelogram motion at all times.

The relative positioning of members 10 and 18 is controlled by a hydraulic cylinder assembly 22. A cross shaft 23 is pivotally mounted on member 18 by means of suitable bearings 24. A pair of forwardly projecting arms 25 extends radially outward from the central rotative axis of cross shaft 23 to positions above the member 10. The outer ends of arms 25 are provided with transverse horizontal pins 26 which are slidably received in slots 27 cut through connecting links 28 pivoted to the element 10. The pins 26 and cooperating slots 27 constitute lost motion connections which allow limited motion of arms 25 relative to links 28.

Cross shaft 23 is rotatable about its central longitudinal axis by means of a central lever 29 fixed thereto. The hydraulic cylinder assembly 22 is pivotally joined between member 18 and the outer end of lever 29 so as to be capable of angularly positioning cross shaft 23 relative to member 18. Assembly 22 may be a conventional double acting cylinder or other suitable extendable device.

Figure 2:
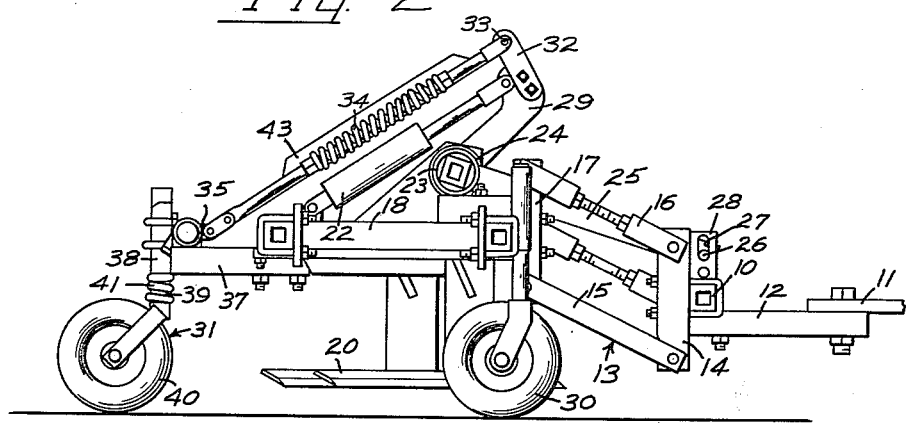
FIGURE 2 is a side view of the tool bar shown in FIGURE 1.
Figure 3:
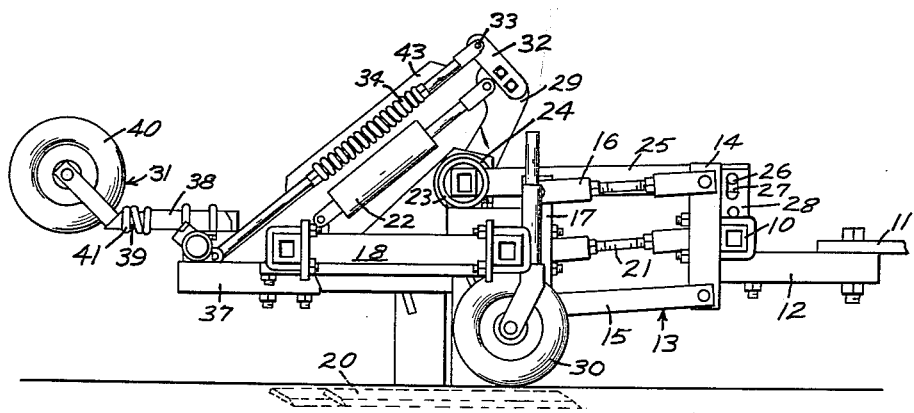
FIGURE 3 is a side view of the tool bar in a lowered position.
Figure 5:
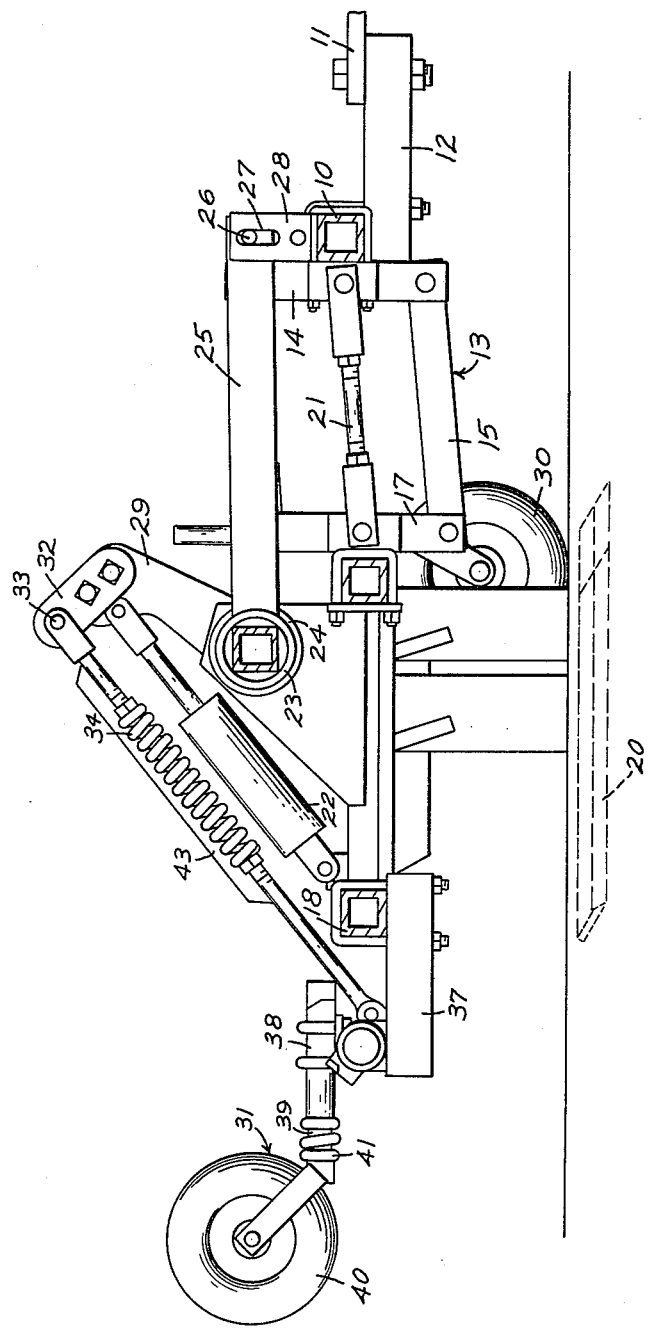
FIGURE 5 is an an enlarged sectional view through line 5—5 in FIGURE 1 with the tool bar in a lowered position.

The three normal positions of the tool bar are illustrated respectively in FIGURES 2, 3 and 5. In FIGURE 2 the hydraulic cylinder assembly 22 is extended, thereby exerting a downward force on links 28 through the pins 26. This elevates the member 18 and implements 20 for transporting or repair purposes.

FIGURE 3 shows the implements 20 being held by a downward force which biases the implements 20 to a proper sub-soil location. This pressure is transmitted directly from the tractor framework through links 28 and arms 25 by contraction of hydraulic cylinder assembly 22. This causes the pins 26 to bear upwardly on links 28 and can produce a downward force on implements 20 directly related to the fluid pressure supplied to hydraulic cylinder assembly 22.

The third position is a mean or normal position for normal soil conditions. Most ground working tools are formed so as to hold themselves below the soil surface as they are pulled along the area being worked. While this balance exists, the forces on assembly 22 may be relaxed and the pins 26 can ride freely within the confines of slots 27 as shown in FIGURE 5. Should the implements 20 require lifting or lowering, this may be readily accomplished by control of hydraulic cylinder assembly 22.

The hydraulic controls may be any suitable type. Normally the manual operations will be carried out on the tractor at a location convenient to the operator. Fluid for assembly 22 may be provided from an auxiliary system on the tractor or any other suitable combination of conventional fluid supply components.

This description has referred to a tool bar which is completely supported by a tractor framework in a fully cantilevered condition. In practice, it is advisable to utilize outboard guage wheels 30, which are suspended from element 18 so as to engage the ground under spring pressure. The wheels 30 prevent one side of the bar from digging in beyond the other side and are of particular value where a wide member 18 is being drawn along a field of uneven elevation.

It has also been found to be desirable to utilize a tail wheel assembly 31 to aid in the support of the member 18 when in its elevated position. The position of assembly 31 is preferably controlled by the hydraulic cylinder assembly 22 and lever 29 as may be seen in FIGURES 2, 3 and 5.

A pair of rigid extensions 32 are fixed to the lever 29. A pin 33 is mounted across the extensions 32. Two parallel tension springs 34 are pivotally connected to the pin 33 at each end thereof. The springs 34 are pivotally connected at their remaining ends to a short lever 35 fixed to a shaft 36 rotatably mounted on brackets 37 fixed to the rear end of member 18.

The shaft 36 has fixed thereto a mounting collar 38 for a wheel supporting shaft 39. The tail wheel 40 is rotatably carried by a suitable mounting assembly on shaft 39. A compression spring 41 urges the wheel downwardly relative to the collar 38.

Figure 4:
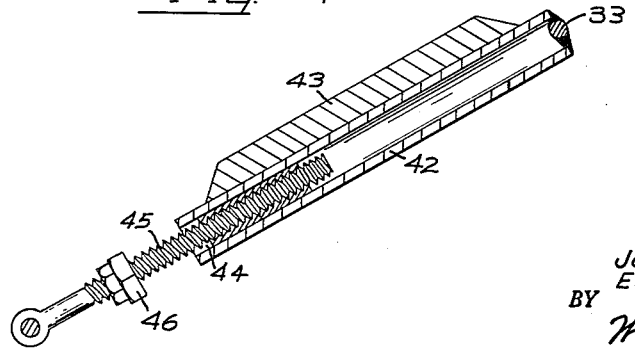
FIGURE 4 is a fragmentary sectional view taken along line 4—4 in FIGURE 1 showing the extensible support for the tail wheel.

The tail wheel 40 is movable from a raised position shown in FIGURE 5 to a ground engaging or vertical position shown in FIGURE 2. In order to provide stability to the mechanism used to move wheel 40, a telescoping support is interposed between lever 35 and extensions 32. This is shown in FIGURE 4. It includes a cylindrical tube 42 with a stiffening rib 43. Tube 42 is pivotally connected to pin 33. It slidably receives a collar 44 within which is threadably engaged a rod 45 pivoted to lever 35. Stop nuts 46 provide an adjustable stop on rod 45 which may be abutted by the adjacent end of tube 42. This will occur when wheel 40 is lifted by the tube 42 into the position illustrated in FIGURE 3.

Figure 6:
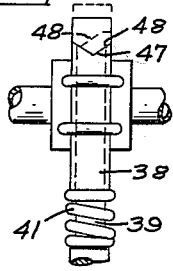
FIGURE 6 is an enlarged rear view of the tail wheel assembly, with an alternate position of the cam being shown in dashed lines.

In order to provide directional stability to wheel 40, the apparatus shown in FIGURE 6 is provided. This is simply a cam 47 on collar 38 and a follower 48 on shaft 39. These normally maintain wheel 40 in a straight ahead position, but are capable of yielding if necessary to negotiate a turn. The present invention provides a tool bar which is in complete control of the tractor operator. It uses the force of the hydraulic cylinder to maintain the implements 20 at the desired location. This force may be used as a lifting or lowering force or may be relaxed to accommodate uneven ground through slots 27. The tool bar will follow precisely the path of the tractor and will not sway from one side to the other.

The adjustable parallelogram assemblies allow one to vary the penetrating angle of implements 20 as may be desired. The shape of member 18 may be varied depending upon its use. The positioning of wheels 30 and 40 may be selected to meet individual requirements or may be eliminated altogether.

Various changes may occur to one in this field without deviating from our basic concept involving the suspension and positioning arrangement for member 18. For this reason, only the following claims are intended as definitions of our invention.

Having thus described our invention, we claim:

1. A tool bar for agricultural earth working implements comprising:
   a first member adapted to be rigidly secured to a tractor frame member;
   a plurality of vertical parallelogram assemblies spaced from one another perpendicularly to the intended direction of travel of the implements relative to the earth, each of said assemblies including a first element rigidly secured to said first member, a second element spaced therefrom, and a plurality of parallel connecting links pivotally joining said first and second elements about spaced horizontal axes;
   a second member rigidly secured to the second element of each parallelogram assembly adapted to carry the earth working implements;
   crank means pivotally mounted on said second member about a horizontal axis perpendicular to the intended direction of travel of the implements relative to the earth, said crank means including an arm rigidly attached thereto and extended radially from said last-named axis;
   means pivotally connecting the arm of said crank means and said first member at a location along the arm remote from said last-named axis, whereby pivotal motion of said crank means will transmit a resulting force from said crank means to said first member;
   and power means operatively connected between said second member and said crank means adapted to selectively pivot said crank means about said last-named axis to thereby locate the elevation of said second member relative to said first member.

2. A tool bar as defined in claim 1 wherein said means operatively connecting the arm of said crank means and said first member includes a lost motion connection adapted to permit limited freedom of motion of said crank means relative to said first member about the pivotal axis of said crank means on said second member.

3. A tool bar as defined in claim 1 wherein said crank means further includes a rigid lever formed integrally therewith and angularly spaced from said arm about the pivotal axis of said crank means on said second member;
   said power means comprising a double-acting hydraulic cylinder assembly pivotally connected at one end to said second member about a first horizontal axis spaced from and parallel to the pivotal axis of said crank means on said second member and pivotally connected at its remaining end to said lever about a second horizontal axis spaced from and parallel to the pivotal axis of said crank means on said second member.

4. In combination with a vehicle having a rigid supporting frame carried by ground engaging means:
   a plurality of vertical linkage assemblies spaced from one another perpendicularly to the intended direction of travel of said frame relative to the ground, each of said assemblies including a first element fixed relative to said frame, a second element spaced therefrom, and a plurality of connecting links pivotally joining said first and second elements about spaced horizontal axes;
   a rigid member secured to the second element of each linkage assembly;
   cross shaft means pivotally mounted on said rigid member about a horizontal axis perpendicular to the intended direction of travel of said frame relative to the ground, said cross shaft means including an arm rigidly attached thereto and extending radially from said last-named axis, said arm being pivotally connected to said frame at a location remote from said last-named axis;

and means operatively connected between said rigid member and said cross shaft means adapted to selectively pivot said cross shaft means about said last-named axis relative to said rigid member.

5. In combination with a farm tractor having a rigid supporting frame carried by ground engaging means, said frame including a rear drawbar formed rigidly therewith; a tool bar for agricultural earth working implements, comprising:

a first member adapted to be rigidly secured to said drawbar;

a plurality of vertical parallelogram assemblies spaced from one another perpendicularly to the intended direction of travel of the implements relative to the earth, each of said assemblies including a first element rigidly secured to said first member, a second element spaced therefrom, and a plurality of parallel connecting links pivotally joining said first and second elements about spaced horizontal axes;

a second member rigidly secured to the second element of each parallelogram assembly adapted to carry the earth working implements;

crank means pivotally mounted on said second member about a horizontal axis perpendicular to the intended direction of travel of the implements relative to the earth, said crank means including an arm rigidly attached thereto and extended radially from said last-named axis;

means pivotally connecting the arm of said crank means and said first member at a location along the arm remote from said last-named axis, whereby pivotal motion of said crank means will transmit a resulting force from said crank means to said first member;

and power means operatively connected between said second member and said crank means adapted to selectively pivot said crank means about said last-named axis to thereby locate the elevation of said second member relative to said first member.

6. A tool bar for agricultural earth working implements, comprising:

a first member positioned transversely to the intended direction of travel of the implements relative to the ground;

means fixed to said first member at its center adapted to fixedly secure said first member to a tractor drawbar;

a pair of vertical parallelogram assemblies spaced along the length of said first member, each parallelogram assembly comprising first and second vertical elements plus parallel adjustable pivot links joined between said first and second vertical elements, the first vertical element of each parallelogram assembly being secured to said first member;

a second member positioned parallel to said first member adapted to carry earth working implements, said second member being secured to the second vertical element of each parallelogram assembly;

a cross shaft rotatably mounted on said second member about an axis parallel to said first member;

a plurality of radially extended arms rigidly attached to said cross shaft in angular alignment with one another, said arms being spaced longitudinally along the length of said cross shaft;

a plurality of rigid links pivotally connected individually to the outer ends of said arms and to said first member, one of the pivotal connections of each link including a slotted connection adapted to allow limited motion of said arms along said links relative to the first member;

a lever fixed to said cross shaft and angularly displaced about said cross shaft axis;

and power means operatively connected between said second member and said lever adapted to selectively pivot said cross shaft about its axis relative to said second member.

7. A tool bar as defined in claim 6 and further comprising:

a shaft rotatably mounted on said second member rearwardly of the cross shaft, the axis of said shaft being parallel to the cross shaft axis;

a wheel assembly carried on said shaft for conjoint rotation with said shaft about said shaft axis;

and means operatively connecting said shaft and said lever adapted to bring said wheel assembly into ground engagement when said power means has pivoted said cross shaft to raise the implements from the ground, and to raise the wheel assembly from ground engagement when said power means has pivoted said cross shaft to lower the implements to the ground surface.

8. A tool bar as defined in claim 6 and further comprising:

a wheel assembly rotatably mounted on said second member about a transverse horizontal axis located rearwardly of the cross shaft;

and means operatively connected between said power means and said wheel assembly adapted to bring said wheel assembly into ground engagement when the implements have been raised from the ground, and to raise the wheel assembly from ground engagement when the implements have been lowered to the ground surface.

9. A tool bar as defined in claim 1 and further comprising:

a wheel assembly rotatably mounted on said second member about a transverse horizontal axis located rearwardly of the cross shaft;

and means operatively connected between said power means and said wheel assembly adapted to bring said wheel assembly into ground engagement when the implements have been raised from the ground, and to raise the wheel assembly from ground engagement when the implements have been lowered to the ground surface.

References Cited in the file of this patent

FOREIGN PATENTS 960,105     Germany _____ Mar. 14, 1957